(12) United States Patent
Ligtendag et al.

(10) Patent No.: US 8,929,175 B2
(45) Date of Patent: Jan. 6, 2015

(54) METHOD OF MARINE TIME-LAPSE SEISMIC SURVEYING

(75) Inventors: Martinus Hendrikus Petrus Ligtendag, Aberdeen (GB); Peter Berkeley Wills, Rijswijk (NL)

(73) Assignee: Shell Oil Company, Houston, TX (US)

( * ) Notice: Subject to any disclaimer, the term of this patent is extended or adjusted under 35 U.S.C. 154(b) by 682 days.

(21) Appl. No.: 12/920,758

(22) PCT Filed: Mar. 9, 2009

(86) PCT No.: PCT/EP2009/052699
§ 371 (c)(1),
(2), (4) Date: Oct. 25, 2010

(87) PCT Pub. No.: WO2009/109663
PCT Pub. Date: Sep. 11, 2009

(65) Prior Publication Data
US 2011/0038228 A1    Feb. 17, 2011

(30) Foreign Application Priority Data

Mar. 7, 2008    (EP) ..................................... 08102367

(51) Int. Cl.
*G01V 1/38* (2006.01)
*G01V 1/36* (2006.01)

(52) U.S. Cl.
CPC ............... *G01V 1/36* (2013.01); *G01V 1/3808* (2013.01); *G01V 2210/612* (2013.01); *G01V 2210/32* (2013.01)
USPC ............................................. 367/24; 367/21

(58) Field of Classification Search
CPC ... G01V 1/36; G01V 1/3808; G01V 2210/32; G01V 2210/612
USPC .......... 367/15, 16, 21, 24, 25, 38, 46, 57, 73; 702/11, 17
See application file for complete search history.

(56) References Cited

U.S. PATENT DOCUMENTS

| 5,214,613 | A | * | 5/1993 | Esmersoy | ........................ 367/31 |
| 5,572,483 | A | | 11/1996 | Chambers et al. | .............. 367/45 |

(Continued)

FOREIGN PATENT DOCUMENTS

| WO | WO9811455 | 3/1998 | ............... G01V 1/28 |
| WO | WO02075363 | 9/2002 | ............... G01V 1/38 |
| WO | WO03087878 | 10/2003 | ............... G01V 1/38 |

OTHER PUBLICATIONS

Ross, C.P., et al—Time-Lapse Seismic Monitoring: Some Shortcomings in Nonuniform Processing, Jun. 1997, The Leading Edge, pp. 1021-1027.

*Primary Examiner* — Daniel L Murphy

(57) ABSTRACT

A method of marine time-lapse seismic surveying of a subsurface formation, comprises providing a baseline survey, providing a monitor survey that includes information about changes in the subsurface relative to the baseline survey, recording a repeat survey so closely in time to one of either the baseline survey or the monitor survey that changes in the subsurface can be ignored but under different near-surface conditions from said one survey, computing a short-time survey difference between the repeat signals and signals comprising said one of either the baseline survey or the monitor survey, computing a monitor survey difference, matching the short-time survey difference and the monitor survey difference to derive a matched noise survey difference, subtracting the matched noise survey difference from the monitor survey difference, and outputting a noise suppressed survey difference based on the result of the subtraction.

9 Claims, 3 Drawing Sheets

(56) References Cited

U.S. PATENT DOCUMENTS

| | | | |
|---|---|---|---|
| 6,438,069 B1 * | 8/2002 | Ross et al. | 367/73 |
| 6,906,982 B2 * | 6/2005 | Calvert | 367/21 |
| 7,577,061 B2 * | 8/2009 | Williamson et al. | 367/38 |

* cited by examiner

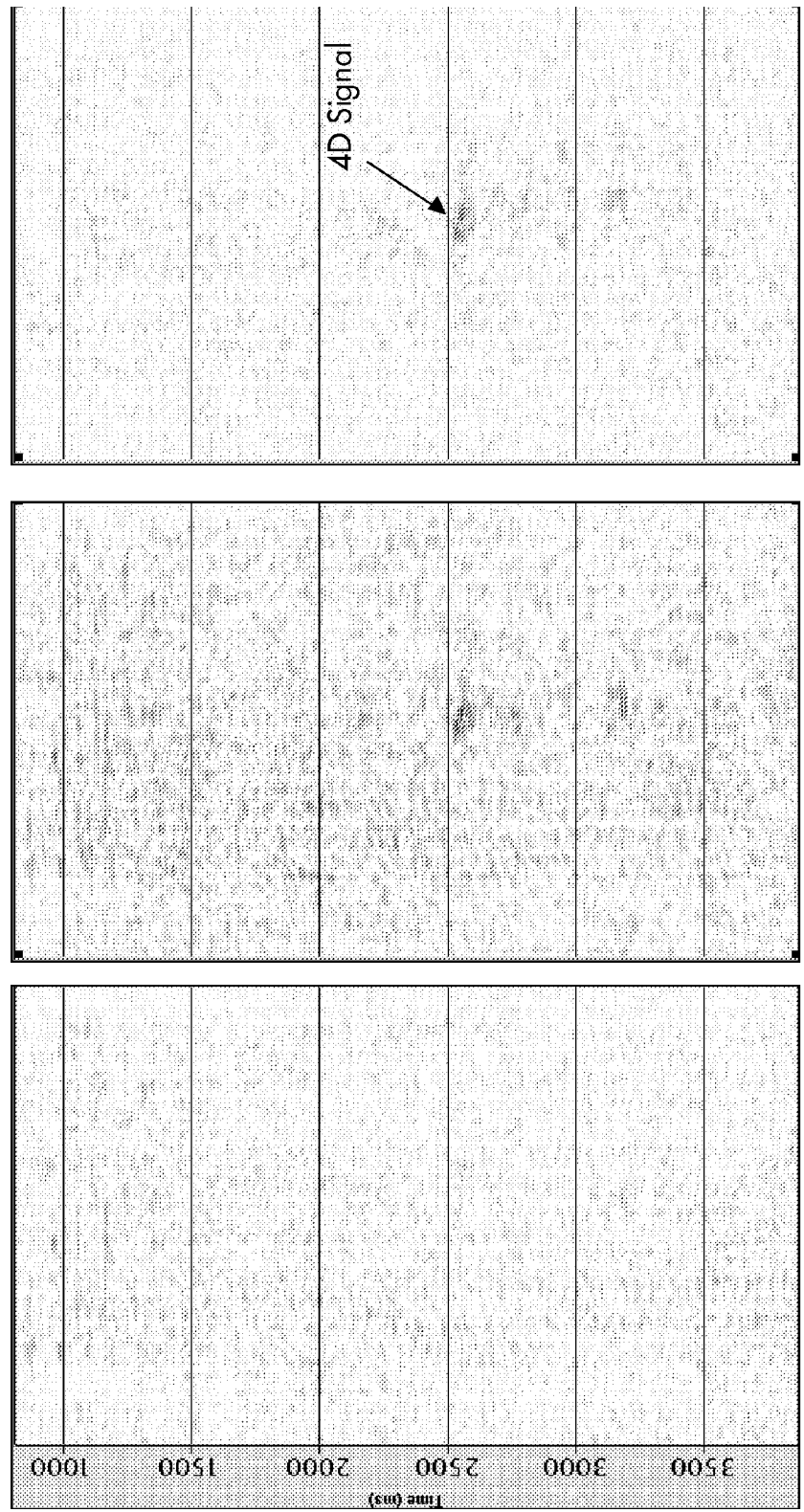

10

METHOD OF MARINE TIME-LAPSE SEISMIC SURVEYING

PRIORITY CLAIM

The present application claims priority to PCT Application EP2009/052699, filed 9 Mar. 2009, which claims priority to European Patent Application No. EP 08102367.3, filed 7 Mar. 2008, which are incorporated herein by reference.

FIELD OF INVENTION

The present invention relate to a method of time-lapse seismic surveying designed to suppress time-lapse artefacts due to the effects of changes in sea state and/or surface conditions.

BACKGROUND OF THE INVENTION

Time-lapse seismic surveying or monitoring involves obtaining seismic data of the same part of the subsurface at different times. It allows studying the changes in seismic properties of the subsurface as a function of time due to for example fluid flow through the underground formation or spatial and temporal variation in fluid saturation, pressure and temperature. Seismic data can be combined to generate images that show the changes. The time-lapse seismic surveying technique has applications such as mapping bypassed oil, monitoring injected reservoir fluids such as water, steam and $CO_2$, and estimating fluid-flow heterogeneity related to pressure compartmentalization and the hydraulic properties of faults and fractures. Time-lapse seismic surveying is also called 4-dimensional seismic surveying.

It is well known that repeatability is a key to the success of time-lapse seismic surveying, and that major concerns are source and receiver locations (see for example the article Time-lapse seismic monitoring: Some shortcomings in non-uniform processing, C P Ross and M S Altan, The Leading Edge, June 1997). Other concerns are source and receiver waveform responses and coupling, and various forms of undesired noise.

Applicants have found that there is another factor that adversely affects the success of marine time-lapse seismic surveying, the properties of the sea.

In international publication WO02075363 the effect of so-called surface multiple reflections is discussed. The surface multiple reflections are contributions to the recorded signal caused by multiple reflections of the seismic energy between the surface of the sea and the sea bottom. In this patent application it is explained that the surface multiple reflections do not repeat, so that when subtracting two signals, recorded at different dates, the difference signal contains an unknown contribution from the difference of the surface multiple reflections. Therefore this difference may not be the same as the difference between the subsurface signals (that are free from surface multiple reflections) and thus the difference is not an indication of changes in the subsurface between the date of recording the first signal and the date of recording the second signal.

In order to provide a method of carrying out at sea a time-lapse survey of a target layer in an underground formation in which non-repeatable effects caused by the surface multiple reflections (also known as time-lapse artefacts) can be suppressed in a simple manner, it is proposed in this publication to record the signals at substantially repeating sea conditions. This method comprises:

(a) arranging a seismic sensor system at a predetermined position;

(b) positioning a seismic source at least one location, wherein each location has a predetermined position, and recording for each location the signal from the seismic sensor system in response to a sound wave emitted by the seismic source;

(c) positioning after a predetermined period of time the seismic source at the location(s) of step (b), and recording, when the appropriate sea properties are substantially repeating, for each location the signal from the seismic sensor system in response to a sound wave emitted by the seismic source; and (d) subtracting the obtained signal from a signal previously obtained to get a difference that is used to detect changes in the target layer as a function of time.

Applicant's co-pending application WO2003087878 (issued as U.S. Pat. No. 6,906,982) proposes a method of carrying out at sea a time-lapse survey of a target layer in an underground formation in which non-repeatable effects caused by the surface multiple reflections can be suppressed in a mathematical way. This method comprises the steps of:

(a) positioning the seismic source at a source location having a predetermined position, and positioning the at least one seismic receiver of the seismic receiver system at a receiver location having predetermined position;

(b) recording for these source and receiver locations for each seismic receiver a set of at least two repeat signals obtained from the seismic receiver in response to a set of at least two sound waves emitted by the seismic source, wherein the at least two sound waves are emitted at different sea states and/or surface conditions but so closely in time that differences in the repeat signals due to changes in the subsurface can be ignored, and measuring the two-way water travel times when recording the repeat signals;

(c) positioning after a predetermined period of time the seismic source and the at least one seismic receiver at the source and receiver locations of step (a), recording for each seismic receiver a monitor signal from the seismic receiver in response to a sound wave emitted by the seismic source, and measuring the two-way water travel time when recording the monitor signal;

(d) assuming a model for the signal that includes the subsurface signal, differences in the subsurface signals due to changes in the subsurface, and the contributions of surface multiple reflections;

(e) determining a set of filter functions that enable eliminating the surface multiple reflections, which filter function(s) are functions of the measured two-way water travel times at the position of the seismic source of step (a);

(f) calculating for each receiver the estimated differences in the subsurface signals from the repeat signals, the monitor signal and the filter function(s), which estimated difference is a measure of changes in the subsurface signal caused by changes in the target layer in the time elapsed between recording the repeat signals and recording the monitor signal; and (g) outputting the estimated difference.

Both methods described above involve relatively complex calculations and require measurement of two-way water times. Additionally, the method described in WO02075363 requires the sea conditions to be precisely repeated in the base and monitor acquisitions and this is difficult to arrange in marine seismic acquisition. The method described in WO2003087878 requires the measurement of seismic two-way-times, which requires either additional acquisition hardware or an imprecise measurement using the standard acquisition setup. Neither of the above methods are adaptive and thus might leave artefacts due, say, to rapidly varying waveheight.

Therefore there is a need to develop a simple adaptive method to suppress time-lapse artefacts due to the effects of changes in sea state and/or surface conditions and conditions without requiring the measurement of two-way water travel times.

SUMMARY OF THE INVENTION

In some embodiments, the present invention includes a method of marine time-lapse seismic surveying of a subsurface formation, using a seismic source system comprising at least one seismic source and a seismic receiver system comprising at least one seismic receiver, using the steps of: a) positioning the seismic source system at a source location; (b) positioning the seismic receiver system at a receiver location; (c) recording for these source and receiver locations for each seismic receiver a set of two repeat signals obtained from the seismic receiver in response to a set of two sound waves emitted by the seismic source system, wherein the two sound waves are emitted at different near-surface conditions but so closely in time that differences in the repeat signals due to changes in the subsurface can be ignored; wherein the two sound waves are emitted at different sea or surface conditions but so closely in time that differences in the repeat signals due to changes in the subsurface can be ignored; (d) positioning after a predetermined period of time the seismic source system and the seismic receiver system at approximately the source and receiver locations of step (a) and recording for each seismic receiver a monitor signal from the seismic receiver in response to a sound wave emitted by the seismic source system; (e) computing a baseline difference which is a sample-by-sample difference between the repeat signals recorded in step (c); (f) computing a monitor difference which is a sample-by-sample difference between at least one of the repeat signals recorded in step (c) and the monitor signal recorded in step (d); (g) matching the baseline difference and the monitor difference to derive a matched noise difference; (h) subtracting the matched noise difference from the monitor difference; and (i) outputting a noise suppressed monitor difference determined as a result of step (h).

The method may comprise repeating steps (d) through (h). The matching in step (g) may comprise comparing the monitor difference and the baseline difference, deriving one or more filters; and applying the one or more filters to the baseline difference to make the baseline difference resemble the monitor difference, or the matching may comprise a least squares optimization process or a cross equalization process.

In other embodiments, a baseline signal may be recorded first, followed by at least two repeat signals that are recorded close together in time and sufficiently after the baseline signal that changes in the reservoir can be detected between the baseline and the monitor surveys. These embodiments comprise (a) positioning the seismic source system at a source location; (b) positioning the seismic receiver system at a receiver location; (c) recording for each seismic receiver a baseline signal from the seismic receiver in response to a sound wave emitted by the seismic source system; (d) positioning after a predetermined period of time the seismic source system and the seismic receiver system at the source and receiver locations of step (a) and recording for each seismic receiver a monitor signal from the seismic receiver in response to a set of two repeat signals obtained from the seismic receiver in response to a set of two sound waves emitted by the seismic source system, wherein the two sound waves are emitted at different surface conditions but so closely in time that differences in the repeat signals due to changes in the subsurface can be ignored; wherein the two sound waves are emitted at different sea or surface conditions but so closely in time that differences in the repeat signals due to changes in the subsurface can be ignored; (e) computing a monitor difference which is a sample-by-sample difference between the repeat signals recorded in step (d); (f) computing a baseline difference which is a sample-by-sample difference between at least one of the repeat signals recorded in step (d) and the baseline signal recorded in step (c); (g) matching the baseline difference and the monitor difference to derive a matched noise difference; (h) subtracting the matched noise difference from the baseline difference; and (i) outputting a noise suppressed baseline difference determined as a result of step (h).

As illustrated by the foregoing embodiments, the invention includes a baseline survey, a monitor survey that is recorded sufficiently after the baseline signal that changes in the reservoir can be detected between the baseline and the monitor surveys, and a repeat signal, which is used to establish a baseline difference, also referred to as a short-time signal difference. The repeat signal can be near in time to either the baseline signal or the monitor signal, and is preferably sufficiently near in time that changes in the reservoir can be ignored. The short-time signal difference is in turn used to suppress or remove data attributable to short-time changes in the sea, water, and/or surface conditions from the gathered data, leaving only information about long-term changes, including reservoir changes.

BRIEF DESCRIPTION OF THE DRAWINGS

The present invention is better understood by reading the following description of non-limitative embodiments with reference to the attached drawings, wherein like parts of each of the figures are identified by the same reference characters, and which are briefly described as follows:

FIG. 3A shows an example of a baseline difference as determined in the present invention;

FIG. 3B shows an example of a monitor difference as determined in the present invention; and FIG. 3C shows an example of a noise-suppressed monitor difference as determined in the present invention.

DETAILED DESCRIPTION

In the specification and in the claims, the word 'signal' is used to refer to raw, unprocessed data as well as to processed data in the form of one seismic trace. A set of one or more signals is termed a 'survey'. The term 'subsurface signal' is used to refer to a signal that contains information from the subsurface only, and does not include surface multiple reflections. This subsurface signal is also called the primary signal. The 'target layer' in the subsurface is a layer or a number of subsurface layers that one is interested in monitoring. In the latter case, the layers can be separated by layers that are not of interest.

As used herein, "baseline" refers to a survey that is recorded before another survey or set of surveys.

The word "monitor" refers to a survey or set of surveys recorded chronologically after another survey or set of surveys.

The phrase "sea state" is used to refer to the local height of the sea surface relative to the local height of the seafloor, which can vary because of tides, waves, atmospheric pressure, water temperature, seafloor subsidence or other physical conditions.

The phrase "near surface sediments" refers to sediments lying beneath the seafloor but above the target layer.

As used herein, the phrase "near-surface conditions" is used to refer to any physical attribute of the sea or the near surface sediments that can affect the time taken for a wave to propagate from the sea surface to any of the near surface sediments, thus affecting the detailed behaviour of seismic surface multiples. Sea state provides one example of near-surface conditions.

Figure 1:
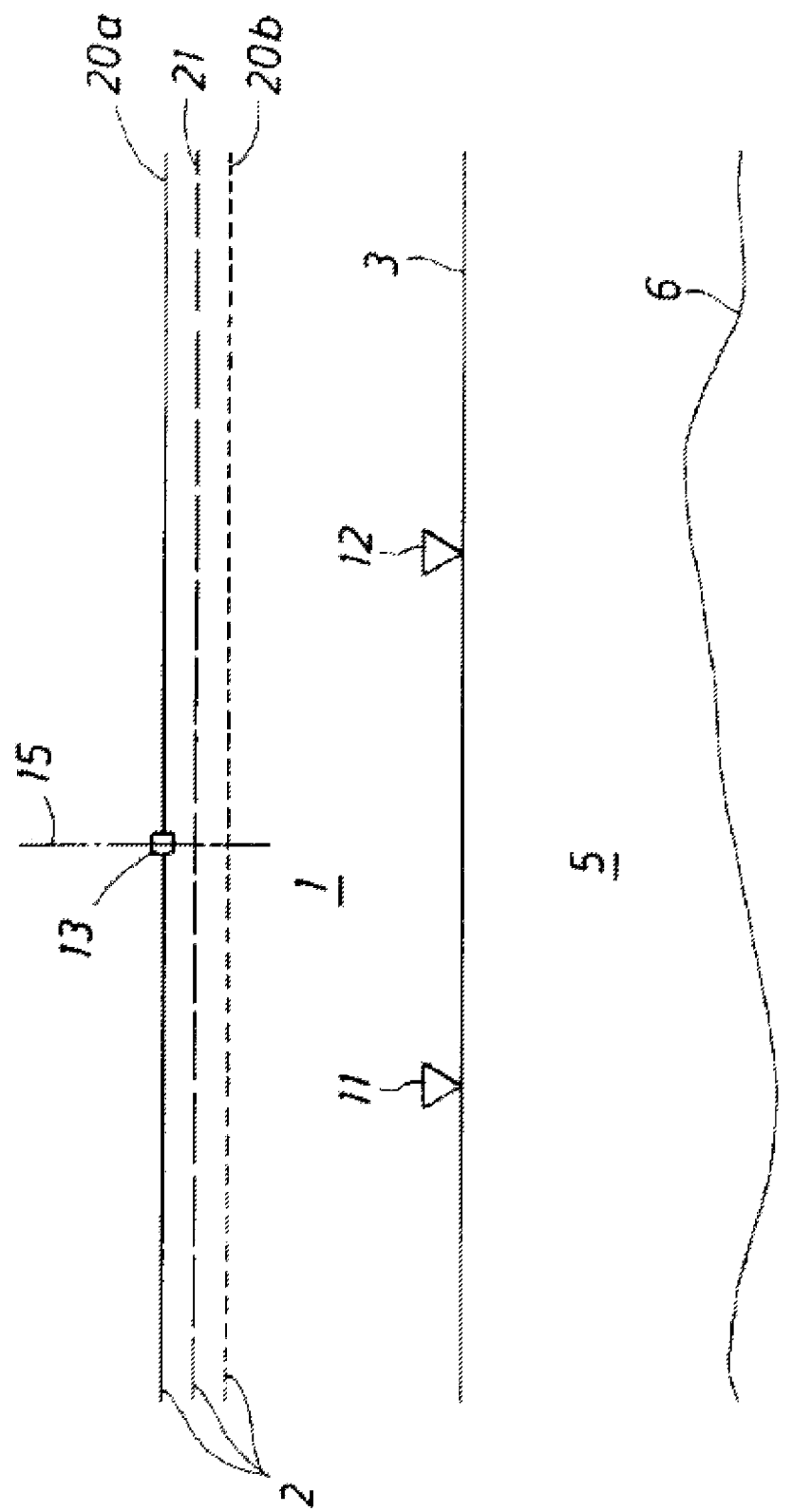
FIG. 1 shows schematically carrying out the surveying steps of the method of the present invention.

Reference is now made to FIG. 1. A body of water 1 is shown schematically in FIG. 1 representing the sea bounded by a sea surface 2, a sea bottom 3, and the subsurface 5 below sea bottom 3. Subsurface 5 contains at least one reflector 6.

In the method according to one embodiment of the invention a seismic receiver system comprising at least one seismic receiver is located at a predetermined position. In FIG. 1 the seismic receiver system comprises two seismic receivers 11 and 12. Alternatively the seismic receiver system may comprise a single seismic receiver or more than two seismic receivers. The receiver location has a predetermined position in the body of water 1. In FIG. 1, the receivers are shown on the seabed, but it will be understood that they can alternatively be positioned above the seafloor.

In preferred embodiments of the invention, a seismic source system 13 may optionally be placed at a predetermined position 15. The seismic source system is shown as comprising a single seismic source; however more than one seismic source may be used. The position 15 is the horizontal position of the source, which is the longitude-latitude position of the seismic source system 13. The horizontal position of the source is schematically shown as a dash-dot line. Vertically the seismic source system is positioned at the sea surface 2. Alternatively the seismic source may be positioned elsewhere, for example underwater using a deep tow source.

It will be clear that at different times the sea surface will be at different levels, for example due to tidal differences. In FIG. 1 three different levels are shown and these levels are referred to with reference numerals 20a, 20b and 21, respectively.

The present invention relates to carrying out a time-lapse seismic survey that includes carrying out a baseline survey, carrying out a monitor survey at a later date and determining the differences between the baseline survey and the monitor survey to evaluate the changes in the underground formation that occurred between the two surveys. The baseline survey is carried out first, once the source and receiver have been positioned as desired.

After a predetermined period of time has lapsed since the first or baseline survey, for example after one year, a monitor survey is conducted. To this end, seismic source system 13 is again positioned at horizontal position 15. For each seismic receiver 11, 12 a monitor signal is recorded in response to a sound wave emitted by the seismic source system in horizontal position 15.

In order to reduce the effects of multiples, the method according to the present invention includes the step of recording at least one repeat survey. The repeat survey is recorded using the same source and receiver locations as the baseline and monitor surveys, but is preferably recorded at substantially different near-surface conditions (e.g. at sea levels 20a and 20b, respectively). Importantly, the repeat survey is recorded so closely in time to either the baseline survey or the monitor survey that differences between that survey and the repeat survey due to changes in the subsurface 5 are insignificant and can be ignored. In practice, the method will usually comprise shooting only one repeat survey; however using two or more repeat surveys and sound waves is also contemplated.

Figure 2:
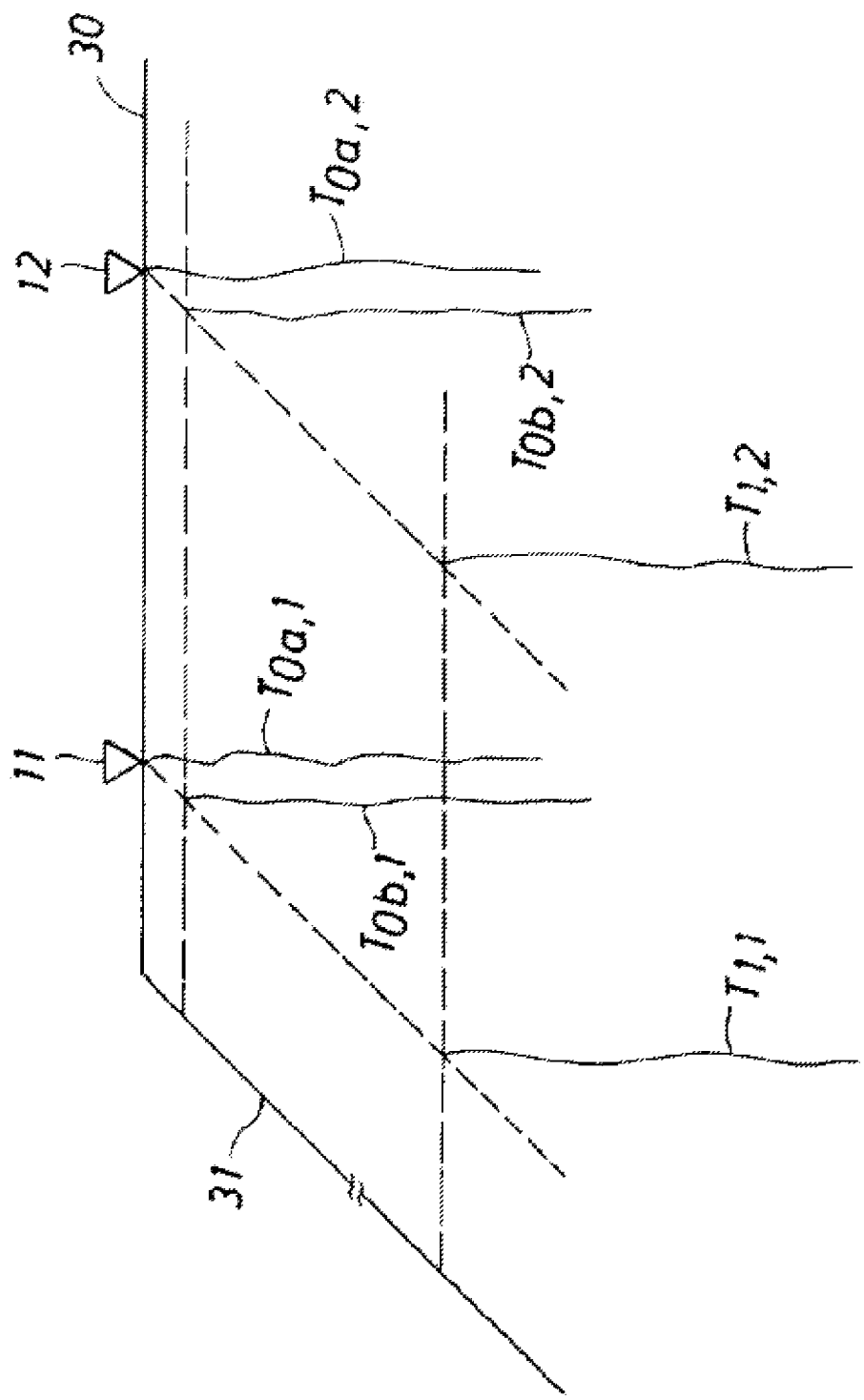
FIG. 2 shows schematically the way in which the signals are related.

FIG. 2 illustrates an embodiment of the invention in which the repeat survey is made at a time near the time of the baseline survey. In FIG. 2, the seismic receivers 11 and 12 are located on axis 30, and axis 31 is the time-axis.

The baseline and repeat signals recorded by each of the two seismic receivers 11 and 12 are $T_{0a,1}$ and $T_{0b,1}$ respectively for seismic receiver 11, and $T_{0a,2}$ and $T_{0b,2}$ respectively for seismic receiver 12. The recordings are made with the seismic source system 13 in horizontal position 15 (see FIG. 1) and so closely in time that the subsurface signal response does not change. In this example, the repeat survey can be either signals $T_{0a,1}(t)$ and $T_{0a,2}(t)$, or $T_{0b,1}(t)$ and $T_{0b,2}(t)$.

The monitor survey, recorded later in time, comprises the monitor signals $T_{1,1}$ for seismic receiver 11 and $T_{1,2}$ for seismic receiver 12.

In the next step, a short-time signal difference (shown in FIG. 3A) is computed. The short-time signal difference is a sample-by-sample difference between the two signals recorded previously. As stated above, the repeat signal is made so closely in time that differences between the repeat signal and the baseline signal due to changes in the subsurface 5 are insignificant and can be ignored. Thus, the short-time survey difference represents a difference for two surveys between which there has been no subsurface change and is therefore a measure of time-lapse noise created by the near-surface conditions.

Referring again to FIG. 2, computing the short-time signal difference for receiver 11 involves computing a sample-by-sample difference between $T_{0a,1}$ and $T_{0b,1}$. It will be understood that, in embodiments in which the repeat surveys are made substantially after the baseline survey, as described below, the short-time signal difference would be calculated as the difference between those later-collected repeat signals.

In the next step, a monitor signal difference (shown in FIG. 3B) is computed. The monitor signal difference is a sample-by-sample difference between at least one baseline signal and the monitor signal. This represents a normal 4D difference, which contains subsurface signals as well as noise. Referring again to FIG. 2, computing a monitor signal difference for receiver 11 would involve computing the difference between $T_{1,1}$ and $T_{0a,1}$, between $T_{1,1}$ and $T_{0b,1}$, or between $T_{1,1}$ and some combination of $T_{0a,1}$ $T_{0b,1}$. FIG. 3B represents the survey output based on the conventional method for time-lapse seismic surveying.

According to the invention, after the short-time survey difference and the monitor survey difference are calculated, a matched noise survey difference is derived through a matching procedure. In this sense, matching refers to the process of comparing two sets of seismic traces and deriving a filter or set of filters to make the first set of traces resemble the second as closely as possible. Matching is a standard operation in time-lapse analysis and may be performed via a variety of methods including but not limited to least squares optimization. Other known methods of matching can be applied. Matching may alternatively be referred to as cross equalization. In this application a filter is derived to make the short-time survey difference resemble the monitor survey difference, or vice versa. Application of the filter to the short-time survey difference is termed the matched noise survey difference.

In the final step of the method the matched noise survey difference is subtracted from the monitor survey difference to yield a noise suppressed survey difference. The noise suppressed survey difference (as seen in FIG. 3C) represents a data set in which noise created by physical processes other than subsurface change has been suppressed. It is apparent that the output shown in FIG. 3C is much clearer and precise than the output from the conventional method shown in FIG. 3B.

As mentioned above, in another embodiment of the invention, the repeat survey may be shot at a time close to the monitor survey, i.e. at a point in time other than during the initial baseline survey.

In this embodiment, as above, seismic source system 13 is initially positioned at a source location and for each seismic receiver 11, 12 a baseline signal is recorded in response to a sound waves emitted by the seismic source system in horizontal position 15. In contrast to the embodiment described above, however, a repeat signal is not necessarily made close in time to the baseline survey.

After a predetermined period of time, for example after one year, a monitor survey is conducted. To this end, seismic source system 13 is again positioned at horizontal position 15. For each seismic receiver 11, 12, a set of at least two monitor signals are obtained from the seismic receiver 11 or 12 in response to a set of at least two sound waves emitted by the seismic source system 13.

In order for one of these two monitor signals to serve as a repeat signal, the two sound waves used to obtain the monitor and repeat signals are preferably emitted at different near-surface conditions (e.g. at sea levels 20a and 20b, respectively) but so closely in time that differences in the repeat signals due to changes in the subsurface 5 can be ignored.

In the next step according to this embodiment, a short-time signal difference is computed. In contrast to the embodiment above, in this embodiment, the short-time signal difference is a sample-by-sample difference between the monitor and repeat signals. Because these two signals are recorded so closely in time that changes in the reservoir can be ignored, this represents a difference for two signals where there has been no subsurface change, thus it is a measure of time-lapse noise created by the near-surface conditions.

In the next step, a monitor signal difference is computed. The monitor difference is a sample-by-sample difference between at least one of or a combination of the monitor signals and the base signal. This represents a normal 4D difference which contains subsurface signals as well as time-lapse noise.

After the short-time survey difference and monitor survey differences are calculated, a matched noise difference is derived through a matching procedure. In this embodiment a filter is derived to make the short-time survey difference resemble, in some metric such as least squares, the monitor survey difference or vice versa. Application of the filter to the short-time survey difference is termed the matched noise survey difference.

In the final step the matched noise survey difference is subtracted from the monitor survey difference to yield a noise suppressed survey difference. As described above, the noise suppressed survey difference gives an image in which noise depending on variables other than subsurface change has been suppressed. Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature and elements described separately may be optionally combined.

What is claimed is:

1. A method of marine time-lapse seismic surveying of a subsurface formation without measuring two-way water travel times, comprising the steps of:
    a) providing a baseline survey comprising a set of baseline signals recorded in response to a sound wave emitted at a source location and received at a receiver location;
    b) providing a monitor survey comprising a set of monitor signals recorded in response to a sound wave emitted at substantially the same source location and received at substantially the same receiver location as in step a), wherein the monitor signals include information indicative of changes in the subsurface relative to the baseline survey;
    c) providing a repeat survey comprising a set of repeat signals, wherein the repeat signals are recorded in response to sound waves emitted so closely in time to one of either the baseline survey or the monitor survey that changes in the subsurface can be ignored, but wherein the repeat survey is recorded under different near-surface conditions from said one survey;
    d) computing a short-time survey difference comprising a sample-by-sample difference between the repeat signals comprising the repeat survey and signals comprising said one of either the baseline survey or the monitor survey;
    e) computing a monitor survey difference comprising a sample-by-sample difference between the monitor signals and the baseline signal, between the monitor signal and a combination of the baseline and repeat signals, or between the baseline signal and a combination of the monitor and repeat signals;
    f) matching the short-time survey difference and the monitor survey difference to derive a matched noise survey difference, wherein said matching comprises comparing the monitor survey difference and the short-time survey difference so as to derive one or more filters, and applying the one or more filters to the short-time survey difference so as to reduce differences between the short-time survey difference and the monitor survey difference;
    g) subtracting the matched noise survey difference from the monitor survey difference; and
    h) outputting a noise suppressed survey difference based on the result of step g);
    wherein the performance of steps d)-g) eliminates the need to measure two-way water travel times.

2. The method of claim 1 wherein the repeat survey is recorded so closely in time to the baseline survey that changes in the subsurface between the repeat survey and the baseline survey can be ignored.

3. The method of claim 1 wherein the repeat survey is recorded so closely in time to the monitor survey that changes in the subsurface between the repeat survey and the monitor survey can be ignored.

4. The method of claim 1 further comprising providing an additional survey and repeating steps (e) through (h) using the additional survey.

5. The method of claim 4 wherein the additional survey is not recorded so closely in time to either the baseline survey or the monitor survey that changes in the subsurface between the additional survey and baseline survey or the monitor survey can be ignored.

6. The method according to claim 1 wherein the matching in step f) comprises a least squares optimization process.

7. The method according to claim 1 wherein the matching in step f) comprises a cross equalization process.

8. A method of producing hydrocarbons from a subsurface formation, wherein the subsurface formation is managed on the basis of seismic data processed according to claim 1.

9. A computer readable medium storing computer readable instructions that analyze one or more detected seismic signals, wherein the computer readable instructions carry out the steps of claim 1.

* * * * *